United States Patent
Kim et al.

(10) Patent No.: US 7,480,226 B2
(45) Date of Patent: Jan. 20, 2009

(54) OPTICAL DISC RECORDING/REPRODUCING APPARATUS AND OPTIMUM BIAS POWER DECISION METHOD THEREFOR

(75) Inventors: Sung-kyoo Kim, Yongin-si (KR); Min-seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 542 days.

(21) Appl. No.: 11/048,928

(22) Filed: Feb. 3, 2005

(65) Prior Publication Data

US 2005/0265718 A1 Dec. 1, 2005

(30) Foreign Application Priority Data

May 31, 2004 (KR) .................. 10-2004-0039100

(51) Int. Cl.
*G11B 7/00* (2006.01)
(52) U.S. Cl. ....................... 369/100; 369/116
(58) Field of Classification Search ............ 369/47.53, 369/116, 125, 47.12, 13, 13.26, 13.27, 44.27, 369/53.12, 53.19, 53.26, 53.27, 53.29, 53.3, 369/53.37, 54, 275.3; 398/27
See application file for complete search history.

(56) References Cited

U.S. PATENT DOCUMENTS

| | | | | | |
|---|---|---|---|---|---|
| 5,341,360 | A | * | 8/1994 | Johann et al. | 369/47.53 |
| 5,550,799 | A | | 8/1996 | Inoue et al. | 369/116 |
| 6,269,062 | B1 | * | 7/2001 | Minemura et al. | 369/47.53 |
| 6,463,020 | B2 | * | 10/2002 | Minemura et al. | 369/47.53 |
| 6,557,126 | B1 | * | 4/2003 | Kelly | 369/116 |
| 7,106,678 | B2 | * | 9/2006 | Yano et al. | 369/53.26 |
| 7,149,168 | B2 | * | 12/2006 | Kamon | 369/47.53 |
| 7,200,080 | B2 | * | 4/2007 | Matsumoto | 369/47.12 |
| 2001/0026516 | A1 | * | 10/2001 | Shoji et al. | 369/47.53 |
| 2004/0022166 | A1 | * | 2/2004 | Shoji et al. | 369/125 |
| 2004/0228243 | A1 | * | 11/2004 | Han | 369/47.53 |
| 2005/0117494 | A1 | * | 6/2005 | Nishi et al. | 369/116 |

FOREIGN PATENT DOCUMENTS

| | | | |
|---|---|---|---|
| EP | 1324321 A1 | * | 7/2003 |
| JP | 08-167149 | | 6/1996 |
| JP | 2003196880 A | * | 7/2003 |
| KR | 1999-0084782 | | 12/1999 |
| KR | 2001-0072820 | | 7/2001 |

* cited by examiner

*Primary Examiner*—Hoa T Nguyen
*Assistant Examiner*—Mark Fischer
(74) *Attorney, Agent, or Firm*—Roylance, Abrams, Berdo & Goodman, LLP

(57) ABSTRACT

An optical disc recording/reproducing apparatus and optimum bias power decision method thereof, having an optical pickup, a driving unit which drives a laser diode provided in the optical pickup to emit light corresponding to a certain bias power, a bias power variation unit which varies the bias power and outputs the varied bias power to the driving unit, and a bit error rate measurement unit which reproduces the recorded data, compares the reproduced data and the recorded data, and measures at least one bit error rate. A controller is further provided which calculates a relationship equation between the measured bit error rate and the varied and output bias power upon recording the data, and decides an optimum bias power based on at least one maximum value and at least one minimum value in a curve obtained from the relationship equation.

8 Claims, 3 Drawing Sheets

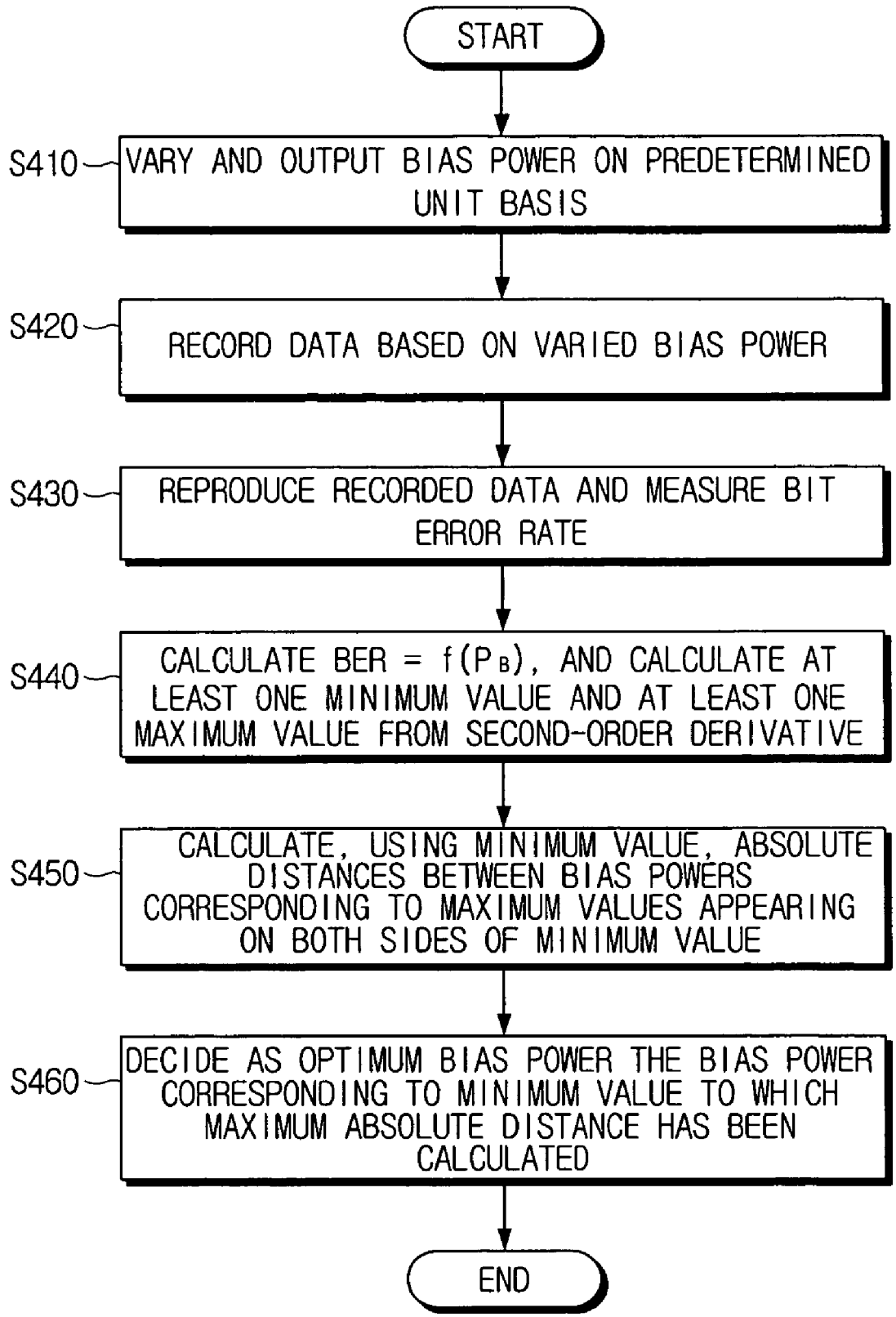

OPTICAL DISC RECORDING/REPRODUCING APPARATUS AND OPTIMUM BIAS POWER DECISION METHOD THEREFOR

CROSS-REFERENCE TO RELATED APPLICATIONS

This application claims the benefit under 35 U.S.C. §119 (a) of Korean Patent Application No. 2004-39100, filed in the Korean Intellectual Property Office on May 31, 2004, the entire contents of which are incorporated herein by reference.

BACKGROUND OF THE INVENTION

1. Field of the Invention

The present invention relates to an optical disc recording/reproducing apparatus and an optimum bias power decision method therefor. More particularly, the present invention relates to an optical disc recording/reproducing apparatus and an optimum bias power decision method therefor through the use of a detected bit error rate.

2. Description of the Related Art

The typical optical disc recording/reproducing apparatus is a device for reproducing data recorded on optical discs such as a DVD, or recording broadcast signals received through a tuner onto such optical discs. In general, bias power is one of the parameters necessary for the optical recording/reproducing apparatus to record and reproduce this data.

The optimum bias power is the power for reading data recorded on optical discs and effectively recording data with minimal errors, and such power can vary from optical disc to optical disc.

In the prior art, spectroscopes such as a prism and photo diodes are used to decide the optimum bias power for the kind of optical disc. That is, the conventional optical recording/reproducing apparatus decides bias power actually delivered to an optical disc by separating light of certain power emitted from a light source in a predetermined ratio through a spectroscope, directing the separated light to the photo diode, and using a separated ratio detected by the photo diode.

However, in the conventional optical recording/reproducing apparatus, if the spectroscope is out of place or if the spectroscope itself is defective, the reliability of the measured bias power is lowered, and in the long run, a problem occurs in that it is difficult to precisely detect the optimum bias power.

Accordingly, a need exists for a system and method for accurately determining an optimum bias power.

SUMMARY OF THE INVENTION

The present invention has been developed in order to solve the above and other problems associated with the conventional arrangement. An aspect of the present invention is to provide an optical disc recording/reproducing apparatus and an optimum bias power decision method therefor, which is capable of enhancing reliability by using a bit error rate calculation.

The foregoing and other objects and advantages are substantially realized by providing an optical disc recording/reproducing apparatus comprising an optical pickup for emitting light on an optical disc and recording data, a driving unit for driving a laser diode provided in the optical pickup to emit the light corresponding to a certain bias power, a bias power variation unit for varying the bias power within a predetermined range on a predetermined unit basis and outputting the varied bias power to the driving unit, and a bit error rate measurement unit for reproducing the recorded data, comparing the reproduced data and the recorded data, and measuring at least one bit error rate. The apparatus further comprises a controller for calculating a relationship equation between the measured bit error rate and the varied and output bias power upon recording the data, and which further decides an optimum bias power necessary to reproduce and record data based on at least one maximum value and at least one minimum value on a curve obtained from the relationship equation.

The controller calculates, based upon the minimum values, absolute distances between bias powers corresponding to maximum values appearing on either side of each minimum value, and decides as an optimum bias power, the bias power corresponding to a minimum value for which a maximum absolute distance has been calculated from among the one or more calculated absolute distances.

The controller also controls the bias power variation unit to set a different predetermined range in which the bias power is varied depending on the kind of optical disc.

The controller still further calculates a second-order derivative of the relationship equation, and obtains at least one maximum value and at least one minimum value.

The foregoing and other objects and advantages are substantially realized by providing an optimum bias power decision method for an optical disc recording/reproducing apparatus comprising steps of (a) varying and outputting a bias power within a predetermined range on a predetermined unit basis, (b) emitting light corresponding to the varied bias power on an optical disc to record data, (c) reproducing the recorded data to obtain reproduced data, (d) comparing the reproduced data and the recorded data and measuring at least one bit error rate, (e) calculating a relationship equation between the measured bit error rate and the varied bias power, and (f) deciding an optimum bias power necessary to reproduce and record data based on at least one maximum value and at least one minimum value of a curve obtained from the calculated relationship equation.

The step (f) calculates, based upon the minimum values, absolute distances between bias powers corresponding to maximum values appearing on either side of each minimum value, and decides as an optimum bias power, the bias power value corresponding to a minimum value for which a maximum absolute distance has been calculated from among the one or more calculated absolute distances.

The step (a) can further set a different predetermined range in which the bias power is varied depending on the kind of optical disc.

BRIEF DESCRIPTION OF THE DRAWINGS

The above aspect and other features of the present invention will become more apparent by describing in detail exemplary embodiments thereof with reference to the attached drawing figures, wherein;

FIG. 4 is a flowchart for illustrating an optimum bias power decision method for the optical disc recording/reproducing apparatus of FIG. 1.

Throughout the drawings, like reference numerals will be understood to refer to like parts, components and structures.

DETAILED DESCRIPTION OF THE EXEMPLARY EMBODIMENTS

Hereinafter, exemplary embodiments of the present invention will be described in greater detail with reference to the accompanying drawings.

Figure 1:
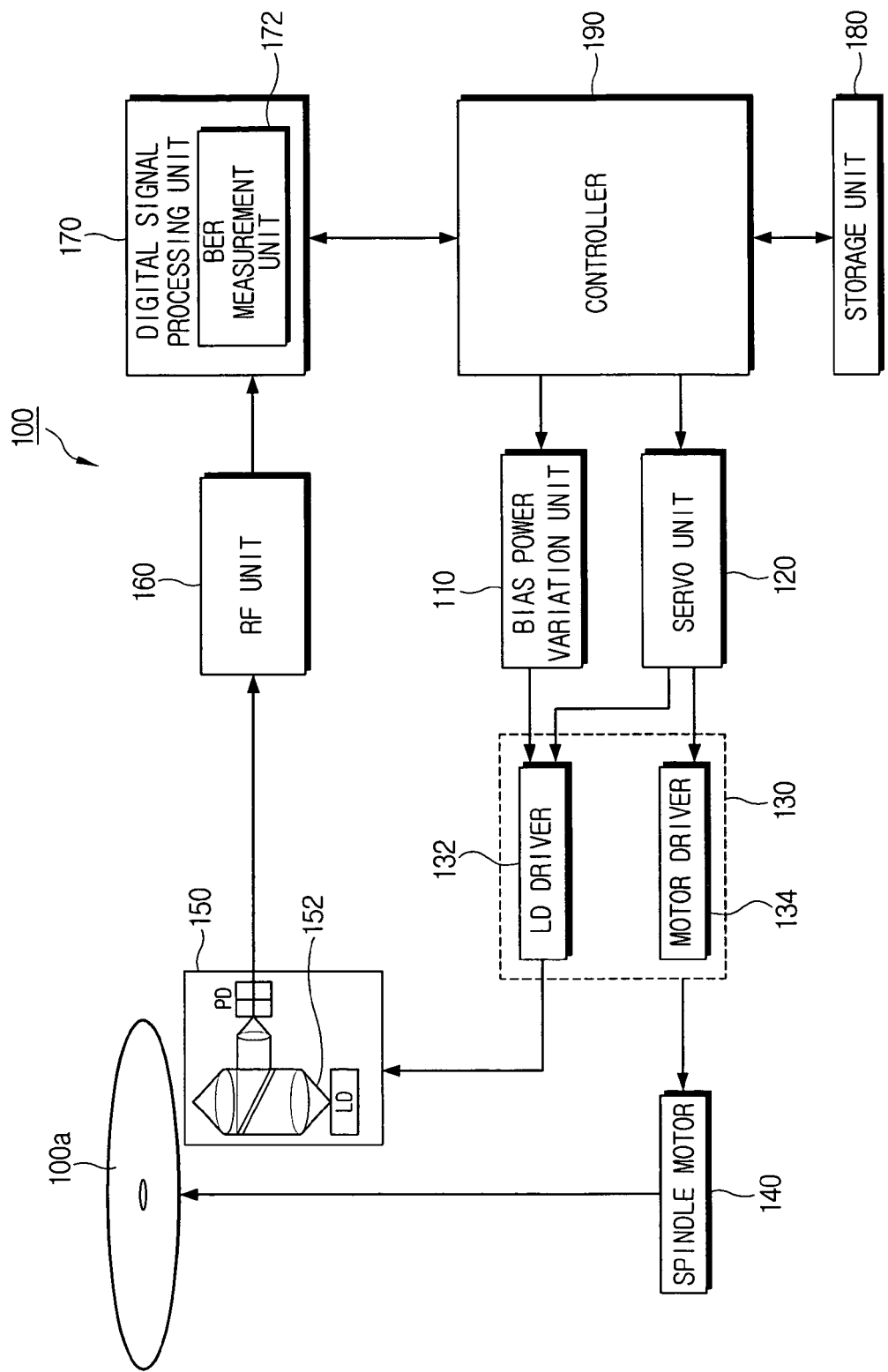
FIG. 1 is a block diagram for illustrating an optical disc recording/reproducing apparatus having a function for deciding an optimum bias power according to an embodiment of the present invention.

FIG. 1 is a block diagram for illustrating an optical disc recording/reproducing apparatus having a function for deciding an optimum bias power according to an embodiment of the present invention.

In FIG. 1, an optical disc recording/reproducing apparatus 100 according to an exemplary embodiment of the present invention includes a bias power variation unit 110, a servo unit 120, a driving unit 130, a spindle motor 140, a pickup unit 150, an RF unit 160, a digital signal processing unit 170, a storage unit 180, and a controller 190.

The bias power variation unit 110 varies the bias power supplied to a laser diode (LD) driver 132 of the driving unit 130 to decide an optimum bias power. The bias power variation unit 110 varies the bias power on a predetermined unit basis, for example, 1 mV, within a certain range of between about 1 mV to about 10 mV, for example, and applies the varied bias power to the driving unit 130. The range of values can be set differently depending on the kind of optical disc 100a.

The optimum bias power is one of a plurality of parameters for deciding the recording or reproducing power necessary to record or reproduce data.

The servo unit 120 controls the focusing servo and the tracking servo according to a focusing error (FE) signal and a tracking error (TE) signal that are output from the RF unit 160 which is described in greater detail below. Further, the servo unit 120 controls the driving unit 130 according to the control instructions of the controller 190.

The driving unit 130 is provided with the LD driver 132 and a motor driver 134.

The LD driver 132 drives a laser diode (LD) of the pickup unit 150 according to the control instructions of the servo unit 120. When data is recorded on or reproduced from the optical disc 100a, the LD driver 132 drives the laser diode to emit light corresponding to the bias power varied by and output from the bias power variation unit 110. To do so, the LD driver 132 supplies a driving voltage to the laser diode LD of the pickup unit 150 corresponding to a certain bias power.

The motor driver 134 supplies a driving voltage to the spindle motor 140 so as to rotate or stop the spindle motor 140 according to a rotation or stop signal that is output from the servo unit 120.

The spindle motor 140 is a motor for rotating the optical disc 100a at a certain speed or stopping the disc when commanded.

The pickup unit 150 emits light on the optical disc 100a to record data on the optical disc 100a and to read data out of the optical disc 100a for data retrieval. To do so, the pickup unit 150 has a laser diode (LD) for emitting light corresponding to a certain bias power on the optical disc 100a, an objective lens 152 for focusing light emitted from the laser diode LD on the surface of the optical disc 100a, a focusing actuator (not shown) for moving the objective lens 152 upwards and downwards for focusing, a tracking actuator (not shown) for driving the objective lens 152 to the left and right for tracking, and a photo diode (PD) for detecting light reflected from the surface of the optical disc 100a.

The RF unit 160 amplifies and rectifies an RF signal output from the pickup unit 150, and applies the rectified RF signal to the digital signal processing unit 170. Further, the RF unit 160 detects FE and TE signals from the RF signal, and applies the detected FE and TE signals to the servo unit 120.

The digital signal processing unit 170 processes a signal output from the RF unit 160 in the reproducing mode and outputs a reproducible signal, and further processes data in the recording mode and outputs a signal that can be recorded.

Further, if a reproducing command signal or a recording command signal is received from the controller 190, the digital signal processing unit 170 converts data for recording into a test signal that can be recorded on the optical disc 100a in order to set the optimum bias power of emitted light.

The digital signal processing unit 170 according to an exemplary embodiment of the present invention, further includes a bit error rate measurement unit 172. The bit error rate measurement unit 172 measures a bit error rate based on a signal output from the RF unit 160, and outputs the same to the controller 190 as described in greater detail below.

The bit error rate is an error rate between data to be recorded on the optical disc 100a, and data reproduced and read out after being recorded on the optical disc 100a, thereby indicating the correlation between the recorded data and the reproduced data. Thus, if a high correlation occurs as indicated by the bit error rate (that is, a minimum bit error rate), the bias power at that time can be decided as an optimum bias power, and the recording or reproducing mode can be obtained more precisely.

Figure 2:
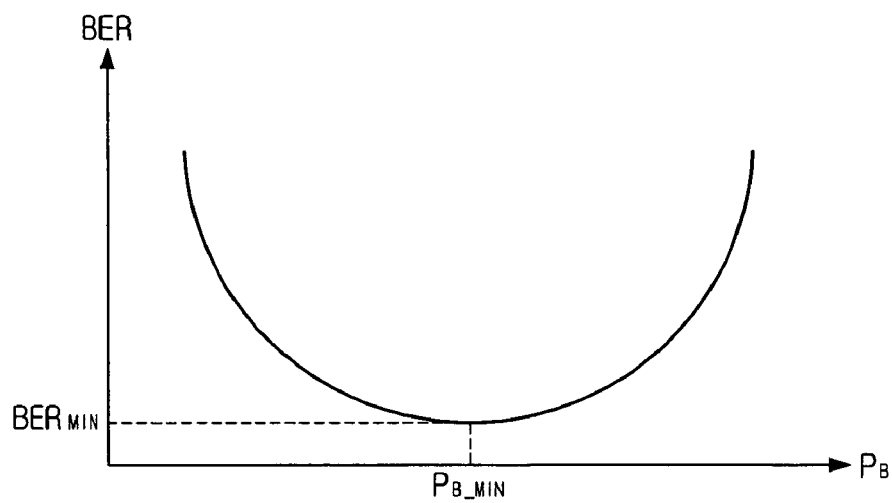
FIG. 2 is a graph for illustrating an ideal relationship between a bit error rate and bias power.

FIG. 2 is a graph for illustrating an ideal relationship between bit error rates and bias powers.

In FIG. 2, 'PB' indicates the bias power applied to the LD driver 132, and 'BER' indicates the bit error rate measured at each bias power. In FIG. 2, the minimum bit error rate indicates that the relationship between the recorded data and the reproduced data becomes maximum at the point where the lowest bit error rate $BER_{MIN}$ appears, so it is this point that reflects the optimum bias power, the bias power $P_{B\_MIN}$.

Figure 3:
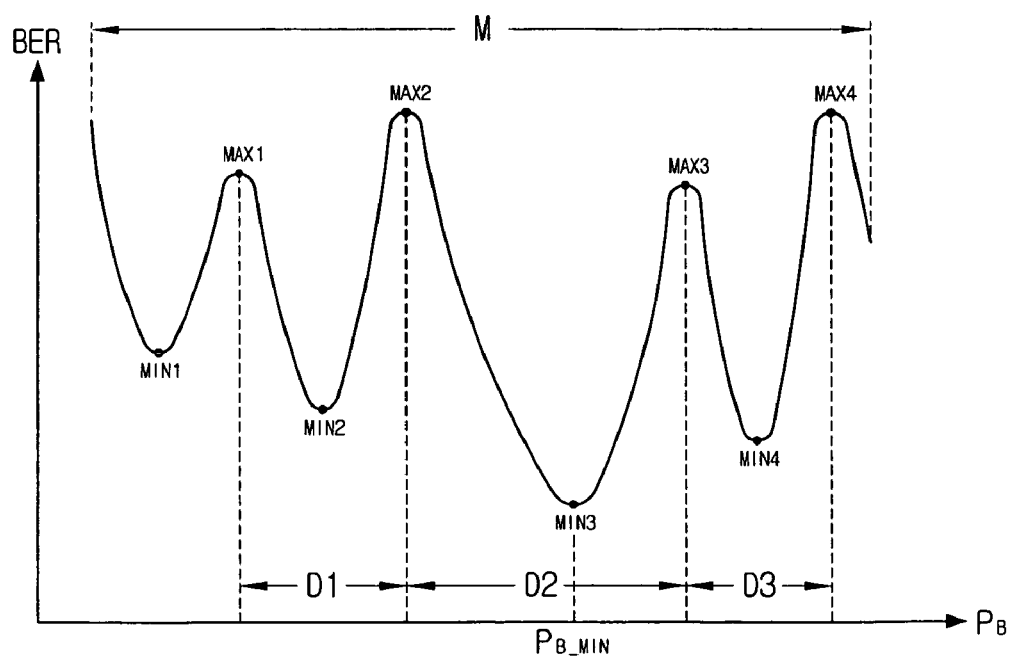
FIG. 3 is a graph for illustrating a real relationship between bias power and a bit error rate measured in the bit error rate measurement unit of FIG. 1.

FIG. 3 is a graph for illustrating the real relationship between bias powers and bit error rates measured by the bit error measurement unit 172 of FIG. 1.

In FIG. 3, 'PB' indicates the bias power applied to the LD driver 132, 'BER' indicates a bit error rate measured at each bias power, and 'M' indicates a range of bias power applied on a predetermined unit basis.

FIG. 3 shows a real relationship between varied bias powers applied to the LD driver 132 and bit error rates measured at the individual bias powers. However, even in t h e real relationship of FIG. 3, a optimum bias power $P_{B\_MIN}$ exists. For example, a relation equation between the bit error rates and the bias powers can be used to show that there exists at least one minimum bit error rate value, and, in such a case, a second-order derivative can be used to then decide an optimum bias power in the exemplary embodiment.

The storage unit 180 stores the variable ranges M of bias powers set by the kinds of optical disc 100a.

The controller 190 controls the overall operations of the optical disc recording/reproducing apparatus 100 according to various control programs stored in a memory (not shown). For example, the controller 190 enables data to be recorded on or to be reproduced from the loaded optical disc 100a.

Further, the controller 190 verifies what kind of optical disc 100a has been loaded. The kind of optical disc 100a can be verified based on a signal output from the RF unit 160 and corresponding to the optical disc 100a.

In general, optical discs are classified into categories including read-only discs such as compact disc ROM (CD-ROM) and digital video disc-ROM (DVD-ROM), once-writable discs such as CD-recordable (CD-R) and DVD-R, and rewritable discs such as CD-Rewritable (CD-RW) and DVD-RAM, depending on whether data is rewritable or not.

Once the kind of loaded optical disc 100a is identified and the recording mode or the reproducing mode is selected by a user input unit (not shown), the controller 190 carries out the operations for deciding an optimum bias power for the selected mode and the kind of optical disc 100a.

Specifically, once the kind of optical disc 100a is verified, the controller 190 controls the bias power variation unit 110 to vary the bias power in a range M set in the storage unit 180 corresponding to the identified disc type. For example, if the optical disc 100a is identified as a CD-R, the controller 190 controls the bias power variation unit 110 to vary the bias power in the range of between about 1 mV to about 15 mV on a predetermined unit basis.

Further, the controller 190 controls the servo unit 120 to drive the LD driver 132 so that the laser diode LD is driven by using a driving voltage corresponding to the bias power varied and output from the bias power variation unit 110.

The laser diode LD of the pickup unit 150 then emits light corresponding to a certain bias power as driven by the LD driver 132, and by which data is recorded on the optical disc 100a.

Once substantially all the data is recorded in the set range of bias power, the controller 190 then reproduces the recorded data and detects the reproduced data, so that an RF signal corresponding to the predetermined bias power is detected. The controller 190 digitally processes the RF signal detected corresponding to the predetermined bias power, and controls the bit error rate measurement unit 172 to measure the bit error rate.

The controller 190 computes a mathematic expression between the measured bit error rate and the bias power varied and output from the bias power variation unit 10 as shown below in Equation (1) when recording data on the optical disc 100a.

$$BER = f(P_B) \quad (1)$$

In Equation (1), BER indicates a bit error rate, and $P_B$ indicates bias power.

Once the mathematic expression such as Equation 1 is obtained, the controller 190 decides an optimum bias power necessary to reproduce and record data based on at least one maximum and at least one minimum value of the curve resulting from Equation 1 and as illustrated in FIG. 3.

Specifically, the controller 190 computes a relationship equation between the bias power varied and output on a predetermined unit basis, and a bit error rate calculated corresponding to the bias power, and then calculates at least one maximum value and at least one minimum value from the second-order derivative of the relationship equation. The controller 190 then calculates, based upon the minimum value or values, absolute distances between bias powers corresponding to the maximum values appearing on either side of the minimum values, and decides as an optimum bias power, the bias power corresponding to the minimum value for which the maximum absolute distance has been calculated from among the one or more calculated absolute distances.

For example, when a relationship equation between the bit error rates and the bias powers draws a curve as shown in FIG. 3, the method of deciding the optimum bias power in accordance with an exemplary embodiment of the present invention can be described as below.

The controller 190 computes first to fourth maximum values MAX1, MAX2, MAX3, and MAX4, and computes first to fourth minimum values MIN1, MIN2, MIN3, and MIN4 from the second-order derivative of the calculated relationship equation.

The controller 190 then calculates absolute distances D1, D2, and D3 between the maximum values appearing on either side of the first to fourth minimum values MIN1, MIN2, MIN3, and MIN4.

Since there only exists the first maximum value MAX1 on one side of the first minimum value MIN1, the controller 190 does not calculate an absolute distance with respect to the first minimum value MIN1.

However, since there exists first and second maximum values MAX1 and MAX2 on either side of the second minimum value MIN2, the controller 190 calculates an absolute distance D1 between bias powers corresponding to the first and second maximum values MAX1 and MAX2.

Also, since there exists second and third maximum values MAX2 and MAX3 on either side of the third minimum value MIN3, the controller 190 also calculates an absolute distance D2 between bias powers corresponding to the second and third maximum values MAX2 and MAX3.

Still further, since there exists third and fourth maximum values MAX3 and MAX4 on either side of the fourth minimum value MIN4, the controller 190 also calculates an absolute distance D3 between bias powers corresponding to the third and fourth maximum values MAX3 and MAX4.

Once the absolute distances D1, D2, and D3 with respect to all the minimum values MIN1, MIN2, MIN3, and MIN4 have been calculated, the controller 190 then decides and assigns as an optimum bias power, the bias power PB_MIN corresponding to the minimum value MIN3 for which the maximum absolute distance D2, of the calculated absolute distances D1, D2, and D3, has been calculated.

FIG. 4 is a flowchart for schematically illustrating the optimum bias power decision method for the optical disc recording/reproducing apparatus of FIG. 1.

In FIGS. 1 to 4, the controller 190 first controls the bias power variation unit 110 to vary and output bias powers in a set range corresponding to the verified kind of optical disc 100a at step S410.

Further, the controller 190 controls the servo unit 120 to record data based on the bias power varied by and output from the bias power variation unit 110 at step S420. Thus, the LD driver 132 drives the laser diode LD to emit light corresponding to the bias power, and data is recorded on the optical disc 100a accordingly.

Once substantially all of the data has been recorded in the set range of bias powers, the controller 190 then controls the bit error rate measurement unit 172 to reproduce the recorded data and measure a bit error rate at step S430.

Once step S430 is completed, the controller 190 calculates a relationship equation such as Equation 1, and then calculates at least one minimum value and at least one maximum value from the second-order derivative of Equation 1 at step S440. Equation 1 shows the relationship between the measured bit error rate and the bias power varied and output from the bias power variation unit 110 when data is recorded on the optical disc 100a.

Once step S440 is completed, the controller 190 calculates, based upon the minimum values, absolute distances between bias powers corresponding to the maximum values appearing on either side of a certain minimum value at step S450. The controller 190 then decides and assigns as an optimum bias power, the bias power corresponding to the minimum value for which the maximum absolute distance has been calculated from among the one or more calculated absolute distances at step S460.

Thus, the optical disc recording/reproducing apparatus 100 according to embodiments of the present invention carries out the recording mode or the reproducing mode using the decided optimum bias power.

As described above, the optical disc recording/reproducing apparatus and optimum bias power decision method therefor according to embodiments of the present invention decides an optimum bias power by using a bit error rate, so as to eliminate errors occurring when deciding the optimum bias power, as well as ensuring reliable recording or reproducing of data.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An optical disc recording/reproducing apparatus, comprising:
   an optical pickup having a laser diode for emitting light on an optical disc and for recording data;
   a driving unit for driving the laser diode equipped in the optical pickup to emit a light corresponding to a certain bias power;
   a bias power variation unit for varying the bias power within a predetermined range on a predetermined unit basis, and for outputting the varied bias power to the driving unit;
   a bit error rate measurement unit for reproducing the recorded data, comparing the reproduced data and the recorded data, and measuring at least one bit error rate; and
   a controller for calculating a relationship equation between the measured bit error rate and the varied and output bias power upon recording the data, and for deciding an optimum bias power necessary to reproduce and record data based on at least one maximum value and at least one minimum value in a curve obtained from the relationship equation,
   wherein the controller further calculates absolute distances between bias powers corresponding to maximum values appearing on either side of each minimum value, and further decides and assigns as the optimum bias power, a bias power corresponding to a minimum value for which a maximum absolute distance has been calculated from among the at least one or more calculated absolute distances.

2. The optical disc recording/reproducing apparatus as claimed in claim 1, wherein the controller further controls the bias power variation unit to set a different predetermined range in which the bias power is varied depending on the kind of optical disc.

3. The optical disc recording/reproducing apparatus as claimed in claim 1, wherein the controller further calculates a second-order derivative of the relationship equation, and obtains the at least one maximum value and at least one minimum value.

4. An optical disc recording/reproducing apparatus, comprising:
   an optical pickup having a laser diode for emitting light on an optical disc and for recording data;
   a driving unit for driving the laser diode equipped in the optical pickup to emit a light corresponding to a certain bias power;
   a bias power variation unit for varying the bias power within a predetermined range on a predetermined unit basis, and for outputting the varied bias power to the driving unit;
   a bit error rate measurement unit for reproducing the recorded data, comparing the reproduced data and the recorded data, and measuring at least one bit error rate; and
   a controller for calculating a relationship equation between the measured bit error rate and the varied and output bias power upon recording the data, calculating a second-order derivative of the relationship equation and obtaining at least one maximum value and at least one minimum value, and for deciding an optimum bias power necessary to reproduce and record data based on the at least one maximum value and at least one minimum value.

5. The optical disc recording/reproducing apparatus as claimed in claim 4, wherein:
   the controller further calculates absolute distances between bias powers corresponding to maximum values appearing on either side of each minimum value, and further decides and assigns as the optimum bias power, a bias power corresponding to a minimum value for which a maximum absolute distance has been calculated from among the at least one or more calculated absolute distances.

6. The optical disc recording/reproducing apparatus as claimed in claim 4, wherein the controller further controls the bias power variation unit to set a different predetermined range in which the bias power is varied depending on the kind of optical disc.

7. An optimum bias power decision method for optical disc recording/reproducing apparatuses, comprising the steps of:
   (a) varying and outputting a bias power within a predetermined range on a predetermined unit basis;
   (b) emitting light corresponding to the varied bias power on an optical disc to record data;
   (c) reproducing the recorded data to obtain reproduced data;
   (d) comparing the reproduced data and the recorded data, and measuring at least one bit error rate;
   (e) calculating a relationship equation between the measured bit error rate and the varied bias power; and
   (f) deciding an optimum bias power necessary to reproduce and record data based on at least one maximum value and at least one minimum value of a curve obtained from the calculated relationship equation by calculating absolute distances between bias powers corresponding to maximum values appearing on either side of each minimum value and deciding and assigning as the optimum bias power, a bias power corresponding to a minimum value for which a maximum absolute distance has been calculated from among the at least one or more calculated absolute distances.

8. The optimum bias power decision method as claimed in claim 7, wherein step (a) further comprises the step of:
   setting a different predetermined range in which the bias power is varied depending on the kind of optical disc.

* * * * *